Feb. 2, 1971  J. S. GOLIGHTLY  3,560,182
BENDING GLASS SHEETS
Filed Jan. 24, 1968  3 Sheets-Sheet 1
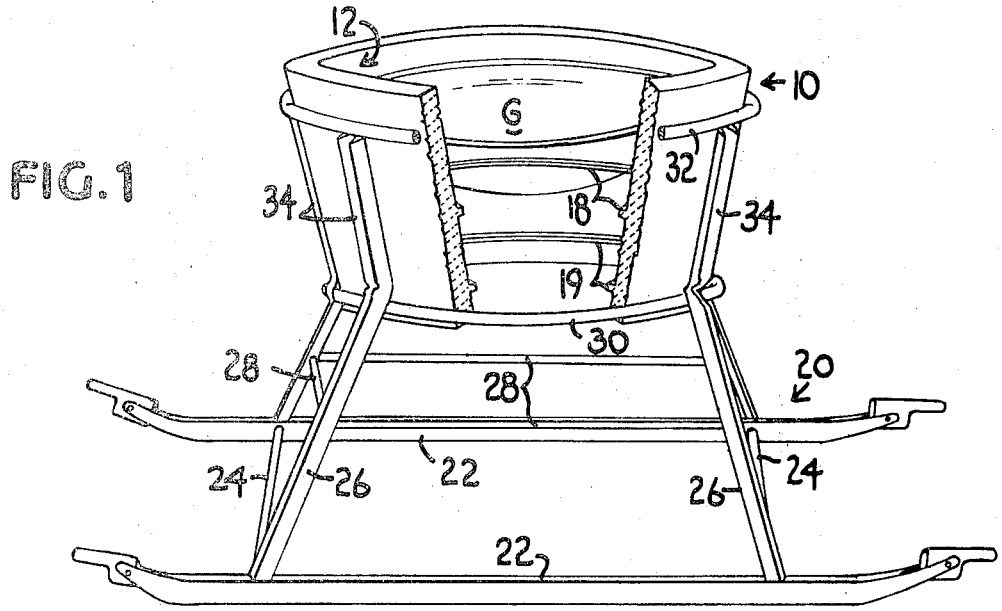
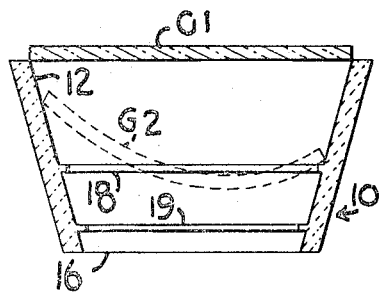
FIG. 2
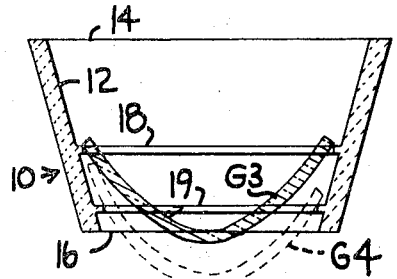
FIG. 3
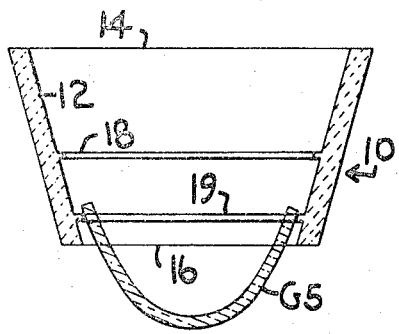
FIG. 4
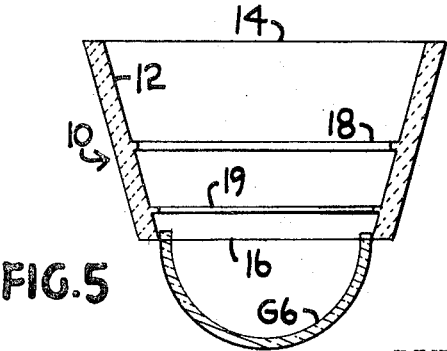
FIG. 5
INVENTOR
JAMES S. GOLIGHTLY
BY
ATTORNEYS

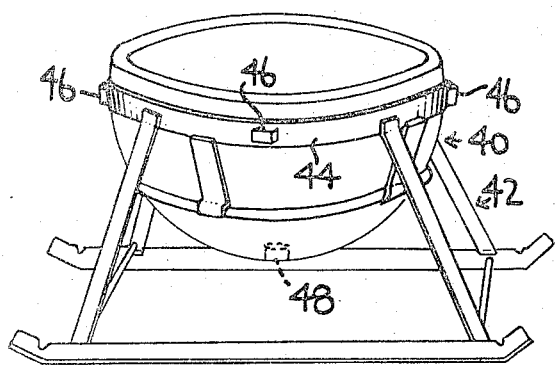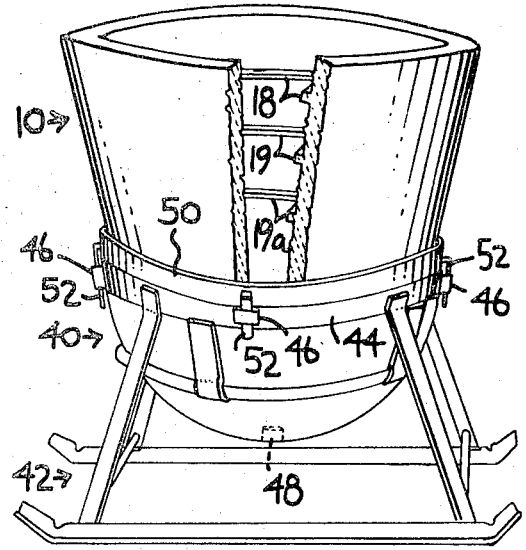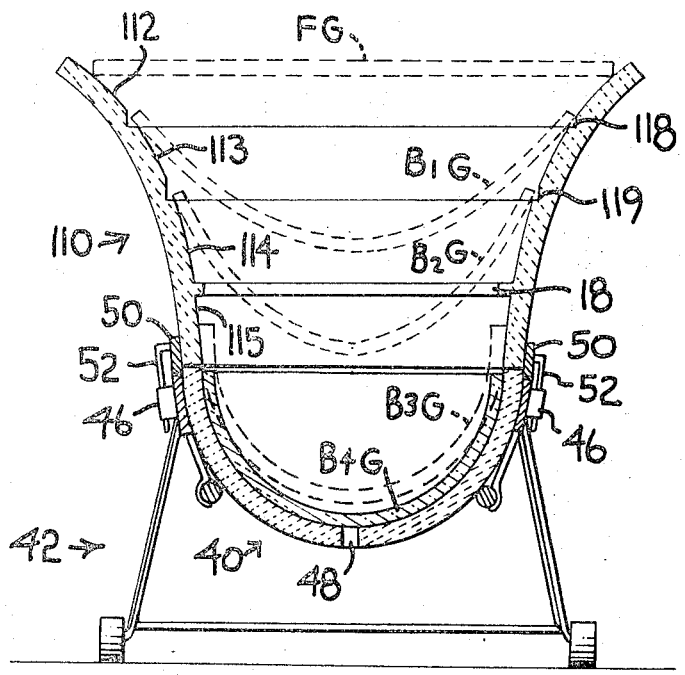

INVENTOR
JAMES S. GOLIGHTLY
BY
ATTORNEYS

# United States Patent Office 3,560,182
Patented Feb. 2, 1971

3,560,182
BENDING GLASS SHEETS
James S. Golightly, Pittsburgh, Pa., assignor to PPG Industries, Inc., a corporation of Pennsylvania
Filed Jan. 24, 1968, Ser. No. 700,242
Int. Cl. C03b 23/00
U.S. Cl. 65—107                              9 Claims

ABSTRACT OF THE DISCLOSURE

Method and apparatus for bending glass sheets by gravity sagging using a slide containing one or more discontinuities, such as grooves and/or ridges, extending circumferentially of the slide in spaced horizontal planes to interrupt free sliding of the sheet down the slide intermittently to interrupt any tilting of the glass sheet relative to the shaping surface of the bending apparatus.

---

This invention relates to bending glass sheets and has special benefits in bending massive glass sheets into spherical shapes. The spherical shapes are joined together at their marginal edges to form spheres for use in deep submergence studies. The ability of glass to withstand high compression stresses make it a suitable material for carrying equipment to great depths under water for such studies.

The shaping of glass discs into hemispherical shapes which are to be joined together to form such spheres is usually accomplished by a gravity sagging technique. Gravity sagging of glass sheets is well known. In the usual process, glass sheets are heated to a deformation temperature, which varies for different thicknesses of glass from about 1080 degrees Fahrenheit for commercial plate glass one-quarter inch thick to more than 1200 degrees Fahrenheit for the same glass composition in sheets three-quarter inch thick, until the heated glass sheets sag by gravity to a desired curved shape.

There are two well known processes for bending glass sheets, the batch type process and the continuous process. In the continuous process, glass sheets are moved in series through an elongated, heated, tunnel-like bending lehr. The lehr provides heat sources sufficient to heat each glass sheet to the temperature necessary for sagging into conformity with a shaping surface during the time the glass sheet is conveyed through the lehr. In the batch type process, a batch of one or more glass-laden molds is introduced into a furnace which is heated gradually to a temperature sufficient to cause the glass to sag into conformance with the shaping surface of the mold. The present invention is capable of being used with either the continuous process or the batch type process.

In bending glass sheets to complicated or sharply bent shapes, such as converting a flat sheet into a hemisphere, the diameter of a flat glass sheet must be reduced uniformly around its marginal perimeter. To accomplish this end, it is necessary to maintain the sheet in proper alignment with the surface which supports the glass in sliding relation thereon during its conversion from one shape to another so that its rate of sliding is uniform around its marginal perimeter. Unless nonuniform sliding of the marginal perimeter of the sheet is prevented, the sagging sheet deviates from its desired shape.

A uniform temperature must be maintained about the supported peripheral portion of a supported glass sheet when a glass sheet is bent by gravity sagging so that it slides down the shaping surface at a uniform rate along its entire marginal portion as its unsupported central portion sags by gravity. Under circumstances where the temperature of the marginal portion is not uniform, one portion of the supported periphery of the glass slides more rapidly down the shaping surface than another portion.

This uneven sliding may be due to one or more of many reasons, such as the glass being of nonuniform thickness so that the thicker regions tend to resist sliding to a greater extent than the thinner regions, or different portions of the lehr or furnace may be hotter than other portions so as to impart a nonuniform heating pattern onto the glass, or, in the case of a continuous bending operation where the lehr has an increasing temperature gradient along the path of glass travel, the leading edge of the glass is continually exposed to a higher temperature than the trailing edge throughout its movement through the lehr and softens more readily. A hotter portion of the glass sheet marginal portion is more fluid and, hence, slides more readily than a colder portion, thus causing the glass to tilt away from its desired orientatioin. Tilting promotes deviation from the desired shape.

Whatever the reason may be for the glass sagging nonuniformly, the present invention remedies this problem by interrupting the free sliding of a portion of the periphery that reaches a predetermined intermediate location between the original position occupied by the glass sheet when first mounted on the mold and the final position the glass sheet occupies when the glass is bent to substantially its desired shape. Thus, by interrupting the free sliding of the portion that slides more rapidly than another portion of the periphery, the slower sliding marginal portion is able to catch up with the faster sliding marginal portion, thus reorienting the glass in a horizontal plane before it is permitted to slide freely once again.

In apparatus conforming to the present invention, peripheral discontinuities in the form of sets of vertically spaced ledges extending inwardly or outwardly of the shaping surface and/or grooves or combinations thereof extending circumferentially in different horizontal planes are formed on the sliding surface to provide one or more impediments to interrupt the free downward flow of the more fluid peripheral portion of the glass sheet. The inwardly or outwardly extending ledges or grooves hold the relatively rapidly sliding peripheral portion of the glass sheet at the level of each successive discontinuity until the remainder of the marginal portion slides to the same peripheral ledge or groove as the first peripheral portion.

The interior portion of the glass continues to sag due to the force of gravity while the free sliding is interrupted. Once this interior sagging in sufficient, the entire marginal portion of the glass sheet rotates over the impeding discontinuity, and the marginal portion slides freely down over the succeeding sliding surface until the free sliding is again interrupted by the next discontinuity in the sliding surface.

Since the marginal portion deviates to a greater extent as the glass sheet approaches the bottom of the slide, the size of each successive discontinuity is greater than that of the next preceding one. In other words, grooves from top to bottom are successively deeper and/or successive ridges protrude outward from the sliding surface greater and greater distance from the top portion to the bottom portion of the surface along which the marginal portion of the glass sheet slides downward during a shaping operation.

The aforesaid periodically interrupted sliding process continues until the glass sheet sags to a desired shape. If necessary, the sheet is then deposited onto a hemispherical mold to produce the exact shape desired from the approximation thereof resulting from the interrupted sliding. No interruptions are needed on the hemispherical mold.

Two such hemispheres so produced are ground and polished to the exact dimensions desired. Then, detection equipment is mounted within one of the hemispheres and the hemispheres joined together at their equatorial edge surfaces in a manner well known in the art, such as fusion welding using a glass frit or clamping using metal O rings.

An illustrative embodiment of the present invention and variations thereof will now be described in order to improve the understanding of the present invention.

In the drawings which form part of a description of illustrative embodiments, wherein like reference numbers refer to like structural elements:

FIG. 1 is a perspective view of one form of mold including a slide in the form of a frustum of an inverted cone with portions omitted to illustrate one embodiment of discontinuity in the form of spaced, circumferential ridges according to the present invention;

FIGS. 2, 3, 4 and 5 are schematic sectional views of the slide of FIG. 1 showing different phases of a bending operation wherein discontinuities in the form of ridges extending inward from the mold shaping surface to the center of the mold; periodically interrupt the free sliding of the glass sheet from its initial position to its final position along its slide as contemplated by the present invention;

FIG. 6 is a perspective view of a spherical mold used for finalizing the bend resulting from sagging the glass on the mold of FIG. 1;

FIG. 7 is a perspective view of a combination mold of the type illustrated in FIG. 6 provided with a slide of the inverted frustum type as depicted in FIG. 1, with parts broken away to illustrate various structural elements;

FIG. 8 is a sectional view of a combination mold similar to that of FIG. 7, but illustrating variations in construction of the slide and of the discontinuities, such as grooves or ledges extending outward from the mold shaping surface away from the center of the mold;

Figure 9:
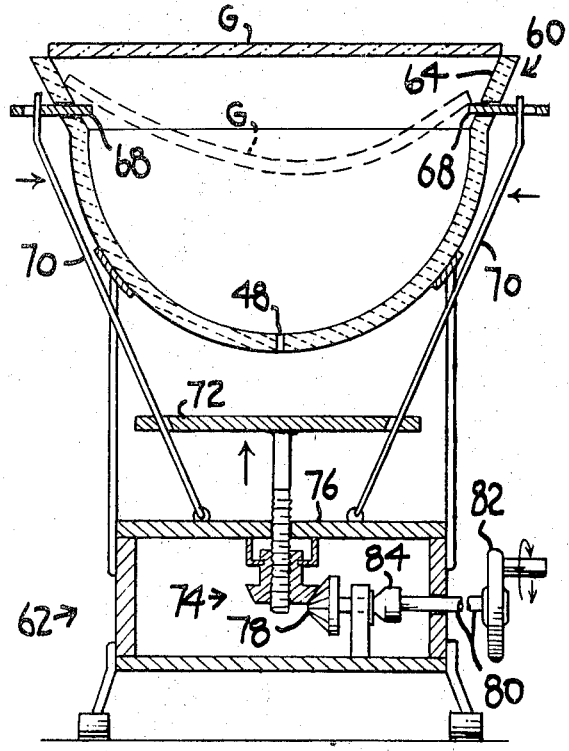
FIGS. 9 to 11 are fragmentary, schematic views of another embodiment of the present invention in operation.

In the drawings wherein like reference numbers refer to like structural elements, FIG. 1 shows a first embodiment of a mold 10 in the form of an inverted frustum of a cone that has an upper sliding surface 12 facing upwardly and inwardly and provided with a relatively wide upper portion 14 tapering downward to a narrow, open bottom portion 16. The upper sliding surface 12 facing upwardly and inwardly is smoothly surfaced except for vertically spaced, horizontally extending circumferential ledges, two of which are shown at 18 and 19. These ledges form discontinuities or ledges extending inward toward the center of the mold 10 from the shaping surface 12.

The mold is of a smooth refractory material, such as an aluminum oxide castible refractory sold under the tradename of "Puretab" by Kaiser Aluminum and Chemical Company. This composition has an approximate composition by weight of about 93 percent aluminum oxide, 5 percent calcium oxide, less than 1 percent iron oxide and approximately 1 percent silicon dioxide, magnesium oxide, sodium oxide and impurities.

A metal framework 20 is provided as a mold support to carry the mold 10 in a furnace or kiln or convey the mold through a tunnel-like lehr where a glass sheet G is supported in bending relation to the upper surface 12 of the mold 10. The mold support 20 comprises a pair of transversely spaced, longitudinally extending runners 22 whose lower surfaces are adapted to be supported on rollers of a conveyer (not shown). The runners 22 are interconnected by cross braces 24 and have legs 26 extending obliquely upward therefrom. A plurality of reinforcement rods 28 connect adjacent legs 26. The upper ends of the legs 26 are welded to a lower ring 30. The latter in turn is connected to an upper ring 32 of slightly larger diameter by a plurality of obliquely upward and outwardly extending connecting ribs 34. The rings 30 and 32 are of sufficient size to support the outer surface of the frustum-shaped mold 10.

Referring to FIGS. 2 through 5, the initial position of the glass is shown at G1 in FIG. 2. When the glass develops an uneven peripheral temperature, the hotter portion of the glass sags more rapidly than the rest of the periphery toward the first or upper ledge 18 and the glass assumes a cocked position shown in somewhat exaggerated form in phantom at G2. The upper ledge 18 stops the rapidly sliding portion of the glass marginal portion from further sliding until the remainder of the peripheral margin of the glass sheet contacts the upper ledge 18 to resume a horizontal orientation for the glass peripheral margin as shown at G4 of FIG. 3. When the central portion of the glass has sagged sufficiently, the entire margin rotates upward over the upper ledge 18 and the glass continues to sag while sliding freely.

If the glass slides to a cocked position again as depicted in the position shown at G4 in FIG. 3, the lower ledge 19 then interrupts the free downward sliding of the glass sheet until the entire marginal portion of the glass reaches the lower horizontal ledge 19 and the glass assumes the position shown at G5 in FIG. 4. Further heating causes the central portion of the glass to sag further and the glass margin then rotates upward over the lower horizontal ledge 19 and the glass once again slides freely to the position shown in G6 of FIG. 5.

A glass sheet bent as described hereinabove only approximates a hemispherical shape desired. It is sometimes necessary to remove the bent and annealed sheet and insert it in a mold of the type depicted in FIG. 6 for reheating and final shaping by an additional heat-sagging operation.

A hemispherical mold 40 shown in FIG. 6 is mounted on a carriage or support structure 42 similar in construction to that of the metal framework 20 that supports the mold of FIG. 1 with the following added feature. An upper ring 44 of the support structure 42 has a series of guides 46 disposed about its perimeter for use in an alternate embodiment of the invention to be described later. The hemispherical mold 40 has a smooth shaping surface free from discontinuities and is also provided with an aperture 48 at its lowermost portion to permit the escape of air so that there will be no pressure of air or gas entrapped between the lower surface of the sagging glass sheet and the upper surface of the hemispherical shaping mold 40 that would prevent the glass from conforming to the smooth shaping surface of the mold. The radius of the aperture 48 is preferably on the order of magnitude of the thickness of the glass sheet being handled on the mold 40 so that it is large enough to permit flow of air that would otherwise be entrapped and small enough to allow the glass to bridge thereover without substantial deviation from its desired shape.

The final bending of the glass sheet on the spherical mold depicted in FIG. 6 is readily accomplished because the glass already has assumed substantially the same shape as the mold during its earlier sag bending on the mold of the type depicted in FIG. 1. However, if the glass sheet is first bent on a mold of the type as in FIG. 1 but without discontinuities to interrupt free sliding periodically, the distortion in shape due to tilting often cannot be corrected by final sag bending on a spherical mold. The use of discontinuities in the first mold virtually eliminates losses of this type.

An alternate embodiment of the present invention shows a hemispherical mold 40 supported in alignment beneath a slide in the form of an inverted frustum of a cone similar to mold 10 superimposed on the hemispherical mold 40. The lower edge surface of the frusto-conical mold 10 conforms to the upper edge surface of the hemispherical mold 40. As in the embodiment of FIG. 1, the upper frusto-conical mold 10 is provided with a series of circumferentially extending interruptions such as ridges, three of which are depicted at 18, 19 and 19a. The frusto-conical mold 10 is provided with a reinforcing strap 50 having a plurality of fingers 52 extending downward therefrom.

Each of the fingers 52 is attached at its upper end to the reinforcing strap 50. The lower end of each finger fits within a guide 46 carried by the circumferential upper ring 44 that forms part of the support frame or carriage 42 for the hemispherical mold 40. This embodiment of the invention does not require any transfer of a partly bent glass to finalize its shape. It is used primarily for one step bending of hemispherical shapes having a diameter up to approximately 30 inches.

In FIG. 8, additional variations of the previous embodiments are shown. The interruptions in the upward facing surface of this latter embodiment comprise two circumferential ledges that project outward of the shaping surface away from the center of the mold in the form of grooves 118 and 119 and a circumferential ledge 18 that projects inward of the shaping surface toward the center of the mold. Each of these are disposed in successively lower horizontal planes for interrupting the free sliding of the marginal portion of the glass sheet down in successive stages of bending prior to reaching the curvature defined by the hemispherical mold 40.

While a combination of grooves and ledges is shown in FIG. 8, it is understood that either grooves or ledges that project either outward or inward of the mold shaping surface may be employed exclusively to interrupt the free sliding of the marginal portion of a glass sheet undergoing heat sagging according to the principles of the present invention.

Another variation disclosed in FIG. 8 involves the shaping of the upper mold 110 so that the successive surface areas 112, 113, 114 and 115, for example, between the interruptions 118, 119 and 18 are successively steeper. Thus, the interior diameter of the mold decreases downward in a manner conforming to the amount that the sagging glass sheet is reduced in diameter as it sags and slides downward and changes its shape to a curvature of decreasing diameter. In FIG. 8, various positions the glass sheet occupies during sagging are indicated by FG (for the flat glass) B1G, B2G, and B3G (for successive positions of the partly bent glass as it slides toward the shaping surface) and B4G (for its final bent configuration).

It is understood that as the glass sags downward that the marginal portion approaches closer and closer to a vertical rather than a horizontal configuration. Therefore, the size of the interruptions, that is the amount that the ridges extend inward or the grooves extend away from the shaping surface increases from interruption to interruption in a downward direction from the upper portion of the shaping surface to the lower portion of the shaping surface of the upper mold 110 or 10. For example, the ridges of a typical mold for handling a glass sheet ¾ inch thick may be ¼ inch thick, ⅜ inch thick and ½ inch thick for successive ridges in a downward direction.

Some typical programs for heating and bending glass sheets to hemispherical shapes will be recited below to provide a complete disclosure of the present invention.

A flat disc ¾ inch thick and 18½ inches in diameter is mounted on an upper mold having a diameter of 18½ inches in its upper portion and a lower diameter of 12½ inches in the shape of a frustum of an inverted cone disposed above a hemispherical mold in a manner depicted in FIG. 7. The diagonal height of the slide of the upper mold is 9½ inches and 2 circumferential ledges extend in vertically spaced horizontal planes about the inner surface of the shaping surface. The upper ledge 18 is located in the horizontal plane where the inner diameter of the shaping surface is 15 inches and the lower ledge 19 is located in the horizontal plane where the inner diameter of the shaping surface is 13 inches.

The sheet is mounted on the mold and the glass laden mold is heated according to the following program:

30 minutes at 650 degrees, then 10 minutes at 750 degrees Fahrenheit, and then 10 minutes at 850 degrees Fahrenheit. This is followed by 8 to 8½ minutes of exposure to a temperature of 1100 degrees Fahrenheit. Annealing is accomplished by subjecting the glass laden mold to a temperature of 900 degrees for 45 minutes. The glass laden mold is next enclosed in an unheated area for an additional 30 minutes and then removed from the lehr and exposed to the ambient conditions of the plant in which bending takes place.

The bent hemisphere is then mounted on a spherical mold of the type depicted in FIG. 6 and again exposed to a heating and cooling cycle similar to the first cycle. Any deviations from a hemisphere are corrected by this second heating and cooling operation, provided the glass sheet has had its tilting corrected while shaped on the first mold. The bent glass is then in condition to be ground and polished to produce a hemisphere 12½ inches in diameter and ½ inch thick.

Another mold which has been used to produce a glass hemisphere 12½ inches diameter from a flat glass disc ¾ inch thick of circular outline of 18½ inch diameter uses a shaping surface of ⅛ inch thick stainless steel type 304. This steel shaping surface has the shape of a frustum of an inverted cone just as the ceramic mold of FIG. 1, but is mounted over a spherical mold such as mold 40 in a manner similar to the apparatus illustrated in FIG. 7.

The glass laden stainless steel mold is first heated in an atmosphere of 700 degrees Fahrenheit for 30 minutes and then transferred to a bending zone maintained at a temperature of 1100 degrees Fahrenheit. After 8 minutes to 8 minutes and 20 seconds of exposure in the bending zone, the glass reaches its proper shape and an operator observing the operation transfers the glass laden mold to an annealing zone where is is exposed for 10 minutes to a 900 degree Fahrenheit temperature environment and then the mold and bent glass move to an unheated enclosed environment for another 10 minutes before being exposed to the room conditions as before.

Other programs for producing larger hemispheres, such as 56 inch diameter hemispheres will be described to show how the present invention may be used to produce different sized hemispheres.

A flat circular disc 80 inches in diameter and 1½ inch thick is mounted above a mold of the type depicted in FIG. 1. The mold is of the ceramic material described hereinabove for the FIG. 1 embodiment, is one inch thick and has an oblique sliding surface 12 inches wide in its oblique plane. The oblique mold surface tapers from a diameter of 80 inches at its upper portion to 64 inches at its bottom portion. Three horizontal ridges extend circumferentially around the shaping surface of the mold and have a thickness of ¼ inch, ⁵⁄₁₆ inch and ⅜ inch, respectively. The lowest ridge is about one inch above the bottom of the slide.

The glass laden mold is introduced into a kiln and heated according to the following schedule:

(1) 30 hours of heat at temperatures increasing at the rate of 40 degrees Fahrenheit per hour including a last hour of heating at 1220 degrees Fahrenheit.

(2) 4 hours of decreasing temperatures at a substantially uniform rate of change to 1000 degrees Fahrenheit.

(3) Maintain the temperature at 1000 degrees Fahrenheit for 3 hours.

(4) Cool at a rate of 20 degrees Fahrenheit per hour until the glass reaches a temperature of 450 degrees Fahrenheit.

(5) Allow the glass to cool naturally.

The glass sheet is thus bent to an approximate hemispherical shape having a diameter of 64 inches and annealed sufficiently to permit its transfer to a mold of the type depicted in FIG. 7, wherein the upper inverted frustum-shaped slide 10 has an upper portion diameter of 64 inches and a lower portion diameter of 56 inches and the lower mold 40 has a hemispherical shape of 56 inch diameter with a central aperture of one inch diameter through the lowermost portion of the mold. The bent glass is mounted on the mold and subjected once again to a program of heating and cooling similar to the one described herein above. After the cycle of heating and cooling, the glass conforms to the shape of the spherical mold and is annealed sufficiently for its final grinding and polishing followed by its lamination to another hemisphere along the equatorial regions to form a sphere that encloses an instrument and/or sensing means useful for deep submergence studies.

The presence of spaced interruptions in the combination slide and mold of FIG. 7 or FIG. 8 is associated with more efficient production of hemispheres than molds equipped with slides without interruptions thereon.

Still another embodiment of the present invention is illustrated in FIGS. 9 to 12. In this embodiment, an upper mold 60 of inverted frusto-conical shape is mounted over a hemispherical mold 40. The latter is supported on a carriage 62.

The upper mold 60 has an upwardly and inwardly facing shaping surface 64 that has a series of apertures 66 (FIG. 12) extending through its thickness in spaced relation about the circumference in a horizontal plane. A ledge member 68 is received in each aperture 66. Each ledge member 68 is longer than the thickness of the upper mold 60 and is slidable within each aperture 66 between an inward position, shown in FIGS. 9 and 10, and a retracted position, shown in FIG. 11.

The inner end of each ledge member 68 is smooth. The outer end of each ledge member is attached to the upper end of a rib 70. Each rib is one of a series of ribs that extends through an apertured plate 72. The latter is mounted for vertical movement on a jack 74 and has its apertures arranged in spaced relation about the circumference of a circle.

The ribs 70 extend downward through the apertures of the apertured plate and are connected to a plate 76 that is part of carriage 62 with their lower ends forming a smaller circle than that of the apertures in the apertured plate 72. The jack 74 is raised and lowered through bevel gears 78, a crank rod 80 and a crank 82. The crank rod is preferably formed of two pieces connected together at a joint 84 that are readily connected and disconnected so that an operator outside a furnace may insert the crank rod 80 through a hole in the wall of a furnace and attach it at the joint 84 to operate the jack 74 from outside the furnace and remove the crank rod when it is desired to move the mold.

It is readily apparent that when the jack 74 is raised, the ribs 70 move toward one another at their upper ends to force the ledge members 68 to move inward of the upper surface 64 of the upper mold 60. Also, when the jack 74 is lowered, the upper ends of the ribs 70 are forced outward to pull the ledge members 68 within apertures 66 outward to a retracted position.

Figure 10:
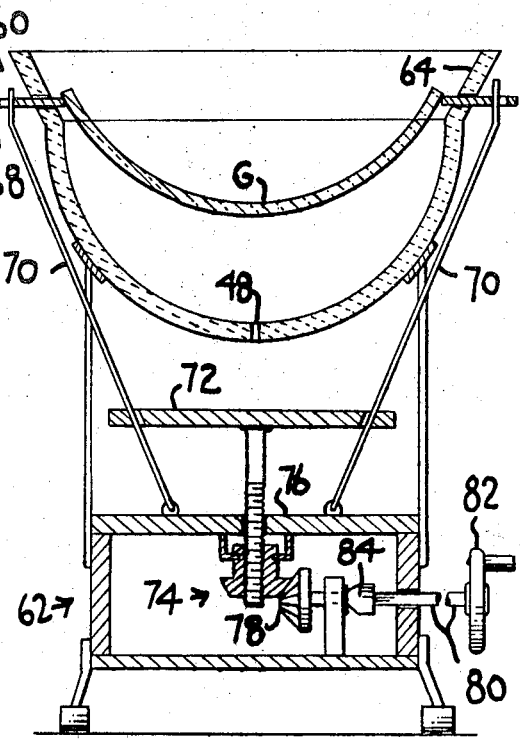
Figure 11:
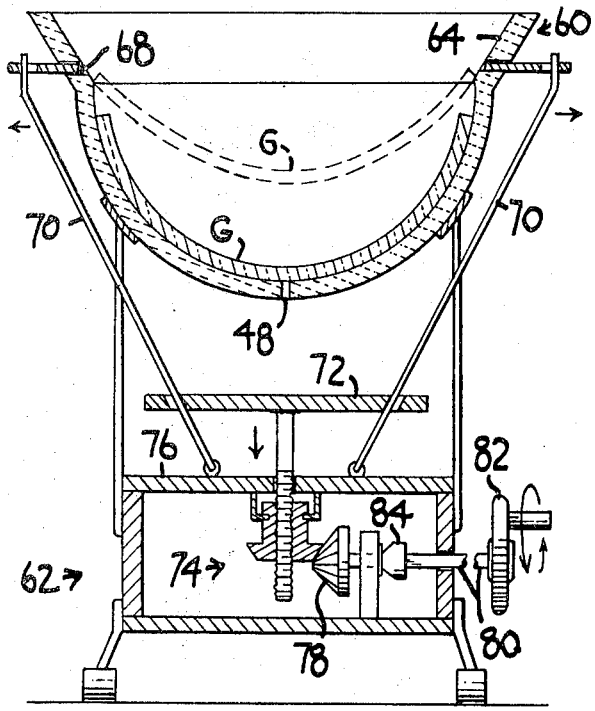
Figure 12:
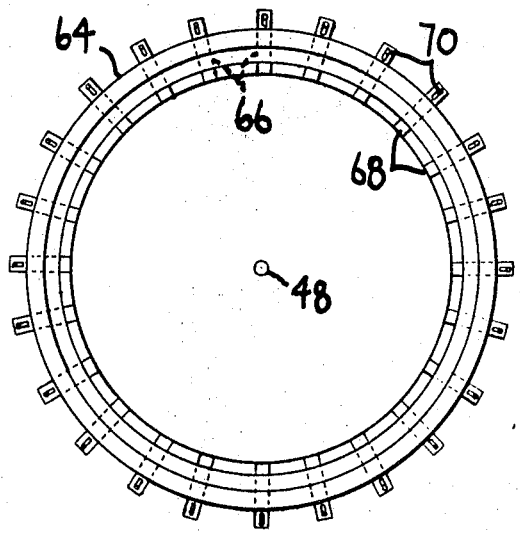
FIG. 12 is a fragmentary plan view of the mold depicted in FIGS. 9 to 11.

This last embodiment works as follows. A glass sheet G is mounted on a mold for bending with the ledge members 68 in their inward extended position. If the glass sheet G should sag unevenly as depicted in phantom in FIG. 9, the extended ledge members 68 interrupt the free sliding of the glass sheet peripheral portion. When the entire glass sheet margin resumes a horizontal position as shown in FIG. 10, the jack 74 is lowered to retract the ledge members 68 in unison. Sliding of the glass sheet resumes as the sheet assumes the position shown in phantom in FIG. 11 and ultimately the final position shown in cross-section.

It is understood that the discontinuous ledge formed by ledge members 68 may be used in combination with other interruptions such as the continuous grooves 118 and 119 and/or ledges 18 and 19. The retractable ledge members should be at the lowest horizontal plane of all the spaced interruptions because they can be inserted a greater distance than permanent ledges if such distance is needed to interrupt the free sliding and can retract whenever free sliding is desired again.

The forms of the invention shown and described herein represent an illustrative preferred embodiment and certain modifications thereof. It is understood that various changes may be made without departing from the spirit of the invention as defined in the claimed subject matter that follows.

What is claimed is:

1. A method of bending a glass sheet into a substantially spherical section comprising:
   (a) supporting the marginal portion of said sheet in a substantially horizontal plane with its intermediate portion unsupported over a shaping surface that has a relatively wide upper portion and a relatively narrow lower portion,
   (b) heating said supported sheet to a temperature sufficient to sag said unsupported intermediate portion relative to said supported marginal portion until the marginal portion folds inward and slides downward along said shaping surface, wherein one portion of said marginal portion is capable of tilting downward with respect to another portion of said marginal portion that is capable of tilting upward,
   (c) interrupting the free downward sliding of said downwardly tilted portion of said marginal portion when it sags to a predetermined level intermediate said upper portion and said lower portion of said shaping surface while continuing said heating and said free downward sliding of said upwardly tilted portion of said marginal portion to insure that said glass sheet is oriented in a horizontal plane,
   (d) then continuing said free sliding of said marginal portion after interrupting said free sliding of said downwardly tilted portion until said glass sheet sags to a desired shape.

2. A method as in claim 1, including interrupting said free sliding at spaced horizontal planes intermediate said upper portion and said lower portion of said shaping surface.

3. Apparatus for heat sagging a glass sheet into an approximately spherical section of a given diameter comprising a glass supporting member of conical section forming an upwardly facing shaping surface whose upper portion has a diameter at least equal to that of a glass sheet to be bent and whose lower portion has a diameter approximating said given diameter, a ledge extending away from said shaping surface extending circumferentially thereof in a horizontal plane between said upper portion of said shaping surface and said lower portion of said shaping surface, said ledge extending from said shaping surface a sufficient distance to engage a marginal portion of a partially sagged glass sheet and prevent further sagging of said engaged marginal portion until substantially the rest of said marginal portion engages said ledge whereby tilting of said sheet during said free sliding is substantially compensated.

4. Apparatus as in claim 3, wherein said ledge extends inward from said shaping surface toward the center of said conical section.

5. Apparatus as in claim 3, wherein said ledge extends outward away from said shaping surface from the center of said conical section.

6. Apparatus as in claim 3, wherein said shaping surface is provided with an additional ledge in a horizontal plane spaced from said first ledge.

7. Apparatus as in claim 6, wherein each successive ledge extends from said shaping surface a greater distance than the amount a ledge closer to said upper portion of said shaping surface extends.

8. Apparatus as in claim 3, wherein said ledge comprises a plurality of ledge members disposed in a common plane and means to move said ledge members between an extended position for interrupting the free sliding of said glass sheet and a retracted position for permitting free sliding of said glass sheet.

9. Apparatus as in claim 8, further including means to synchronize the movement of said ledge members.

References Cited

UNITED STATES PATENTS 3,414,395  12/1968  Reese et al. _____ 65—107

S. LEON BASHORE, Primary Examiner

J. B. HARDAWAY, Assistant Examiner

U.S. Cl. X.R.

65—273, 285